(12) United States Patent
Taubler et al.

(10) Patent No.: US 10,437,689 B2
(45) Date of Patent: Oct. 8, 2019

(54) ERROR HANDLING FOR SERVICES REQUIRING GUARANTEED ORDERING OF ASYNCHRONOUS OPERATIONS IN A DISTRIBUTED ENVIRONMENT

(71) Applicant: LendingClub Corporation, San Francisco, CA (US)

(72) Inventors: David Taubler, Oakland, CA (US); Hyunsuk Han, San Ramon, CA (US); Yana Nikitina, San Francisco, CA (US); John Daum, San Francisco, CA (US); Wira Pradjinata, Fremont, CA (US); Igor Petrunya, Pleasant Hill, CA (US)

(73) Assignee: LendingClub Corporation, San Francisco, CA (US)

( * ) Notice: Subject to any disclaimer, the term of this patent is extended or adjusted under 35 U.S.C. 154(b) by 77 days.

(21) Appl. No.: 15/857,596

(22) Filed: Dec. 28, 2017

(65) Prior Publication Data

US 2019/0205221 A1 Jul. 4, 2019

(51) Int. Cl.
*G06F 11/00* (2006.01)
*G06F 11/14* (2006.01)
*G06F 9/54* (2006.01)
*G06F 9/50* (2006.01)
*G06F 16/25* (2019.01)

(52) U.S. Cl.
CPC ........ *G06F 11/1471* (2013.01); *G06F 9/5033* (2013.01); *G06F 9/5038* (2013.01); *G06F 9/542* (2013.01); *G06F 16/25* (2019.01)

(58) Field of Classification Search
CPC .... G06F 11/1471; G06F 16/25; G06F 9/5033; G06F 9/5038; G06F 9/542

USPC .................................................. 717/683–685
See application file for complete search history.

(56) References Cited

U.S. PATENT DOCUMENTS

| | | | |
|---|---|---|---|
| 2009/0094483 A1* | 4/2009 | Bai ..................... | G06F 11/1443 714/15 |
| 2013/0103977 A1* | 4/2013 | Zimmermann ..... | G06F 11/0751 714/4.11 |
| 2014/0019995 A1* | 1/2014 | Frank ..................... | G06F 9/542 719/318 |

(Continued)

OTHER PUBLICATIONS

RRiBit "What is an Eventbus?", http://www.rribbit.org/eventbus.html, dated Sep. 29, 2018, 1 page.

*Primary Examiner* — Jason B Bryan
(74) *Attorney, Agent, or Firm* — Hickman Palermo Becker Bingham LLP

(57) ABSTRACT

When a particular event record requires a particular service, but that service has failed for the event, an error record that includes an aggregate identifier (AgID) is stored for the event in an error queue. Storing an error record in the error queue causes the service to notify a remediation team to fix the failed event. All events with the AgID in the error record are put on hold and an error record is created for each of these events. The remediation team generates a fixed version of the event record and causes the system to retry the failed service for the event based on the fixed version. If the fixed version of the event is successfully processed, then any other events with the same AgID that have error records in the error queue, are routed in order of enqueue time through the event processor to be handled.

18 Claims, 5 Drawing Sheets

(56) References Cited

U.S. PATENT DOCUMENTS

2014/0304549 A1\* 10/2014 Hsu .................... G06F 11/0793
714/15

\* cited by examiner

102 — RECEIVE A FIRST REQUEST TO PERFORM A FIRST MULTI-SYSTEM OPERATION THAT INVOLVES: A FIRST TASK TO BE PERFORMED BY A FIRST SERVICE, AND A SECOND TASK TO BE PERFORMED BY A SECOND SERVICE ASYNCHRONOUSLY RELATIVE TO PERFORMANCE OF THE FIRST TASK, WHERE THE FIRST TASK INVOLVES AN ITEM IDENTIFIED BY A FIRST AGGREGATE IDENTIFIER

104 — AFTER THE FIRST SERVICE HAS COMPLETED PERFORMANCE OF THE FIRST TASK, RECEIVE A FIRST EVENT RECORD ASSOCIATED WITH THE FIRST MULTI-SYSTEM OPERATION, WHEREIN THE FIRST EVENT RECORD INCLUDES THE FIRST AGGREGATE IDENTIFIER

106 — IN RESPONSE TO RECEIVING THE FIRST EVENT RECORD, DETERMINE WHETHER THE FIRST AGGREGATE IDENTIFIER IS ASSOCIATED WITH ANY ERROR QUEUE RECORD IN AN ERROR QUEUE

108 — RESPONSIVE TO DETERMINING THAT THE FIRST AGGREGATE IDENTIFIER IS ASSOCIATED WITH A FIRST ERROR QUEUE RECORD IN THE ERROR QUEUE, ADD A SECOND ERROR QUEUE RECORD FOR THE FIRST EVENT RECORD TO THE ERROR QUEUE WITHOUT CAUSING THE SECOND SERVICE TO PERFORM THE SECOND TASK

110 — RECEIVING A SECOND REQUEST TO PERFORM A SECOND MULTI-SYSTEM OPERATION THAT INVOLVES: A THIRD TASK TO BE PERFORMED BY THE FIRST SERVICE, AND A FOURTH TASK TO BE PERFORMED BY THE SECOND SERVICE ASYNCHRONOUSLY RELATIVE TO PERFORMANCE OF THE THIRD TASK, WHERE THE THIRD TASK INVOLVES A SECOND ITEM IDENTIFIED BY A SECOND AGGREGATE IDENTIFIER (A)

ERROR HANDLING FOR SERVICES REQUIRING GUARANTEED ORDERING OF ASYNCHRONOUS OPERATIONS IN A DISTRIBUTED ENVIRONMENT

FIELD OF THE INVENTION

The present invention relates to handling failures of asynchronous, multi-system operations, specifically utilizing an error queue to recover from failures to ensure the operations occur in order.

BACKGROUND

An asynchronous event-based architecture allows for handling of high volume system needs without tying up resources as would be required in a synchronous command-based architecture. An example of such an asynchronous event-based architecture is that described in U.S. patent application Ser. No. 15/833,943 filed Dec. 6, 2016, the entire contents of which is incorporated herein by reference. In such asynchronous event-based architectures with services listening for—and reacting to—events from an event stream, handling errors that occur in multi-system operations is performed differently than error handing in synchronous command-based architectures. Specifically, whereas event handling is fairly well understood in a synchronous, command-based architecture (e.g. a ReST service returns a 200 code for successes, and for failures returns some other status code that the caller can handle), asynchronous event handling is not so straight-forward.

For example, in asynchronous event handling, there is no "caller" to handle failures. The event that triggered the task that failed is typically already completed, with its changes committed in a system that is remote relative to the system that encounters the failures. Without additional infrastructure put in place, the only application that will know that a failure has occurred is the failing application itself.

Furthermore, in the context of a command-based architecture, commands represent the intent to perform some action. If a command fails, then the action is never performed. Thus, command failures generally do not represent a long-term problem. In the worst case scenario, an operation initiated by a command fails and a user receives a "Please try again later" error message. On the other hand, in the context of an asynchronous event-based architecture, events are designed to deal with actions that have already been performed. That is, system X is performing task X in response to system Y already having performed and committed the changes for task Y. Thus, failure to properly process an event may cause data between two systems to be inconsistent, or may cause multi-system operations to be left in an incomplete state. In other words, there is generally no turning back when an event is received; the event needs to eventually be processed.

Asynchronous event-based architecture generally deals with an additional concern: namely, events involving the same data items cannot be processed out of order. Otherwise, stale data resulting from older events would be allowed to overwrite more up-to-date data resulting from more recent events.

One approach to dealing with the failure to process an event is to simply re-attempt to process any event that has failed. This may work in some cases, such as when an event processing failure was caused by a transient issue such as a temporary network failure. However, if an event processing failure is caused by an inherent issue in the event, such as invalid, corrupt, or improperly-formatted data, then no amount of retries will ever succeed. Retrying the processing of such events is merely a drain on resources.

Furthermore, in systems where events need to be processed in order, this approach puts all subsequently received events on hold while the system attempts to re-process the failed event. This has the disadvantages of effectively freezing the system and also halting any system that relies on the output of the effectively frozen system.

Another approach to dealing with the failure to process an event involves skipping the failed event. This approach will allow event processing as a whole to continue, but generally results in inconsistent or corrupt data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

In an asynchronous architecture, a multi-system operation on a particular object (object X) may require performance of task A by system A and task B from system B. Completion of task A at system A may cause generation of an event which will cause system B to attempt to perform task B. According to one or more embodiments, when a particular event record (e.g. the event record for task A) requires a particular task to be performed (e.g. task B) but that particular task has failed, an error record is stored in an error queue. The error record includes an aggregate identifier for the event involved in the failure. As shall be described in greater detail hereafter, the aggregate identifier identifies a high-level object (e.g. object X) targetted by the multi-system operation that experienced the failure.

Storing an error record in the error queue causes the service to generate an alert. The alert may, for example, notify a remediation team (comprising one or more human experts) to fix the failed event. All events with the aggregate identifier in the error record, which come through to be processed after the error record is stored in the error queue, are put on hold and an error record is created for each of these events as well. Thus, in the present example, all subsequent events associated with object X are put on hold (error records are put in the error queue) until the failure is resolved. However, events that are associated with aggregate identifiers that are not in the error queue are processed normally.

Once alerted to a new error record that requires remediation, the remediation team generates a fixed version of the failed event record and causes the system to retry the failed service for the event based on the fixed version of the event record. If the fixed version of the event is successfully processed, then any other events with the same aggregate identifier that have error records in the error queue, are routed in order of enqueue time through the event processor to be handled. Thus, after the initial failure involving object X is resolved, all error records involving object X are routed in order of enqueue time, through the event processor.

Multi-System Operations

Figure 1:
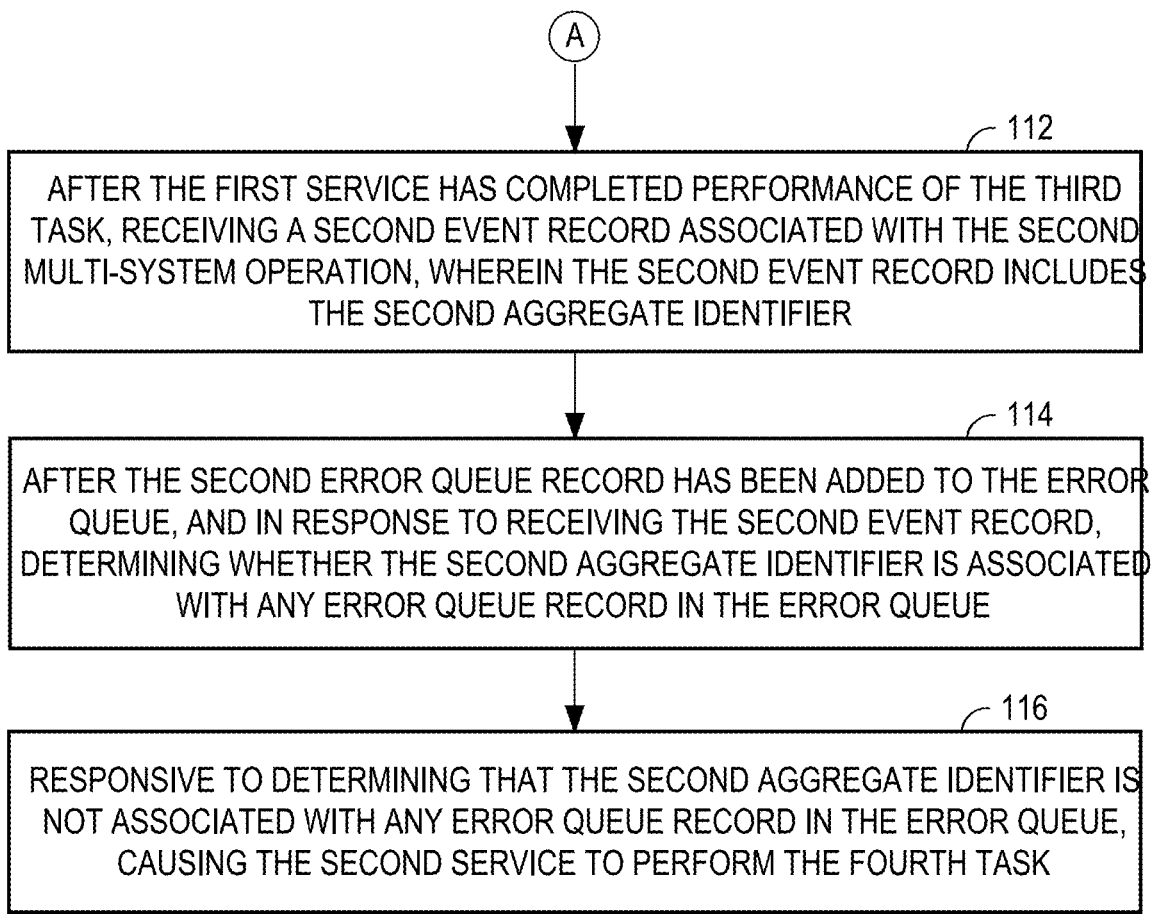
FIGS. 1A-1B collectively represent a flowchart for utilizing an error queue to recover from the failure of a service in the context of multi-system operations.
Figure 2:
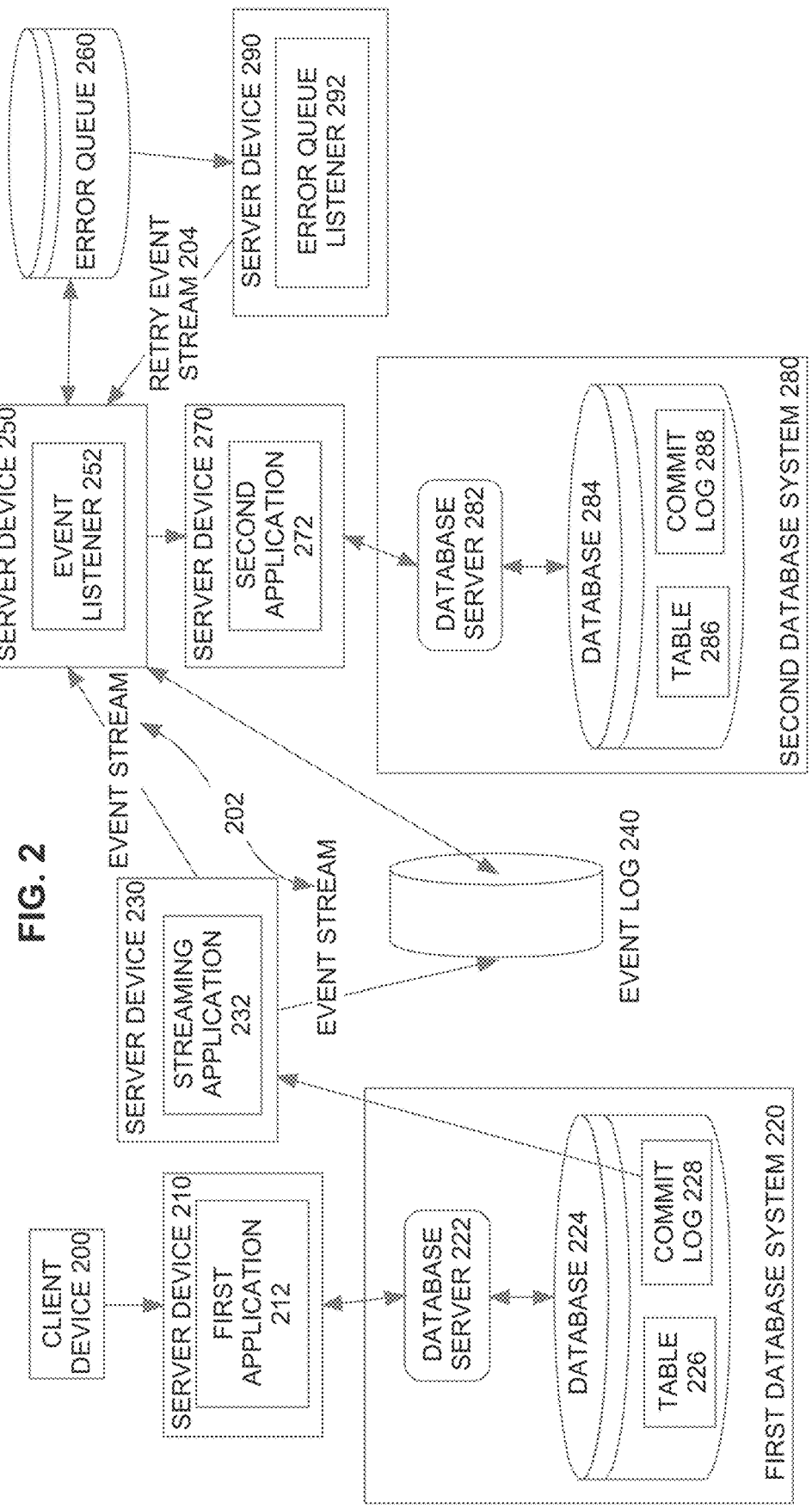
FIG. 2 is a block diagram that illustrates multiple computer systems performing multi-system operations by exchanging event information via a time stream.

An overview of how failure management in the context of multi-system operations may be performed shall be given with reference to FIGS. 1A-1B and 2. FIGS. 1A-1B collectively represent a flowchart 100 for utilizing an error queue to recover from the failure of a service in the context of multi-system operations, according to an embodiment. FIG. 2 is a block diagram that illustrates multiple computer systems performing multi-system operations by exchanging event information via a time stream, according to an embodiment.

Performing a First Task of a Multi-System Operation

At step 102 of flowchart 100, a first request is received, where the first request is a request to perform a first multi-system operation that involves: a first task to be performed by a first service, and a second task to be performed by a second service asynchronously relative to performance of the first task, where the first task involves an item identified by a first aggregate identifier. For example, a multi-system operation shall be described that involves two services. The programs that provide the two services are generally illustrated as first application 212 running on a server device 210 and second application 272 running on a server device 270. To illustrate, the multi-system operation is booking an airline flight; first application 212 represents the airline's reservation system, and second application 272 represents a banking system that manages the account that is to be used to pay for the airfare.

Performance of the multi-system operation begins when a request to perform a multi-system operation is received. For example, the request is in the form of an HTTP request made by a client device 200, and that the request is received over the Internet by a web server that is associated with first application 212 that provides the first service (e.g. reserving a seat on a flight). It shall be assumed that the multi-system operation requires first changes to be made in a first database system 220 associated with the first service (e.g. decrementing the number of seats available on the flight), and second changes to be made in a second database system 280 associated with the second service (e.g. reducing the account balance to reflect the ticket purchase).

In response to receiving the request to perform the multi-system operation, the first application 212 sends commands to database server 222 to cause the first database system 220 to make the first changes as part of a first database transaction (TX1). When the first transaction TX1 commits, the first database system 220 stores commit records for the first transaction in a commit log 228 of the first database system 220. Consequently, upon commit of the first transaction TX1, all changes made by the first transaction will be reflected in commit records within commit log 228 that are all assigned the same transaction identifier TX1-*id*. Specifically, the commit records for the first transaction TX1 will contain the before and after values of all data items changed by the first transaction TX1.

Aggregate Root Identifiers

In domain driven design, a separate service is provided for each "domain", and each domain has a highest-level object that it manages. The highest-level object managed by a service is referred to as the aggregate root of the service. An aggregate is a bounded cluster of entities stored by the system. For example, in a user-management service, a Person that contains information such as addresses and phone numbers would be an aggregate. Since a Person contains all of the other information, Person would be considered the "Primary Root" of the system. Any piece of information would be addressable through its primary root. For example, any given phone number would not exist on its own, but rather would belong to a single Person. Therefore, any modification to that phone number can be considered a modification to the Person as a whole.

Continuing with the previous example, the aggregate root of the first service performed by first application 212 is a flight object, while the aggregate root of the second service performed by second application 272 is a bank account object. Each instance of an aggregate root will have a unique identifier (referred to herein as an "aggregate identifier" or "aggregate root identifier") within its applicable service. Thus, within the first service, each flight will have a unique identifier. Since "flight" is the aggregate root for the first service, the unique identifier for a flight is an aggregate root identifier.

In one embodiment, information for each multi-system operation, which may include the aggregate root ID associated with the multi-system operation and also may include contextual information, is tracked by at least one service of the system. According to one or more embodiments, each event record created for event stream 202 from commit log 228 includes an aggregate root identifier for the aggregate root of one of: the first service (i.e., the "source" root) or the second service (the "destination" root). The source aggregate root identifies the object that was affected by the first service, as recorded by the event record. The destination aggregate root identifies the object that is to be affected by the second service, as recorded by the event record or as determined by event listener 252 or by second application 272.

As shall be described in greater detail hereafter, the presence of the aggregate root identifier in the event metadata of multi-system operations allows for efficient managing of failed services. According to one or more embodiments, the aggregate root identifier included in an event record, as referred to herein, is the destination root identifier unless unavailable (for example, because the destination root aggregate is not yet created). If the destination root identifier is unavailable, then the aggregate root identifier included in an event record, as referred to herein, is the source root identifier.

Performing a Second Task of the Multi-System Operation Based on an Event Stream At step 104, after the first service has completed performance of the first task, a first event record associated with the first multi-system operation is received, wherein the first event record includes the first aggregate identifier. Continuing with the previous example, at this point, the two database systems 220 and 280 are in an inconsistent state relative to the multi-system operation. Specifically, the changes that reduce the number of available seats have been committed to database 224, but database 284 has not yet been changed to reduce the account balance to pay for the airfare. Rather than have client device 200 send a separate request to second application 272 to cause the second application 272 to perform its part of the multi-system operation, the second application 272 performs its part of the multi-system operation based on an event stream 202 produced from commit log 228 of database system 220.

Specifically, as an example of step 104, a streaming application 232 running on a server device 230 reads commit log 228 of the first database system 220, and generates an event stream 202 therefrom. According to an embodiment, an event listener 252, running on a server device 250, reads from and analyzes event stream 202 (either directly or after event stream 202 has been stored in an event log 240) to identify any multi-system operations that involve the second service. Embodiments are described herein based on event listener 252 reading and analyzing event stream 202. However, according to another embodiment, the second application 272 for the second service also acts as the consumer by performing part or all of the functionality described herein for event listener 252, including reading from event stream 202.

In the present example, event stream 202 includes one or more event records that require the second service to be performed in order to perform the respective multi-system operations recorded in the event records. The event listener 252 recognizes these one or more event records as requiring the second service.

Figure 3:
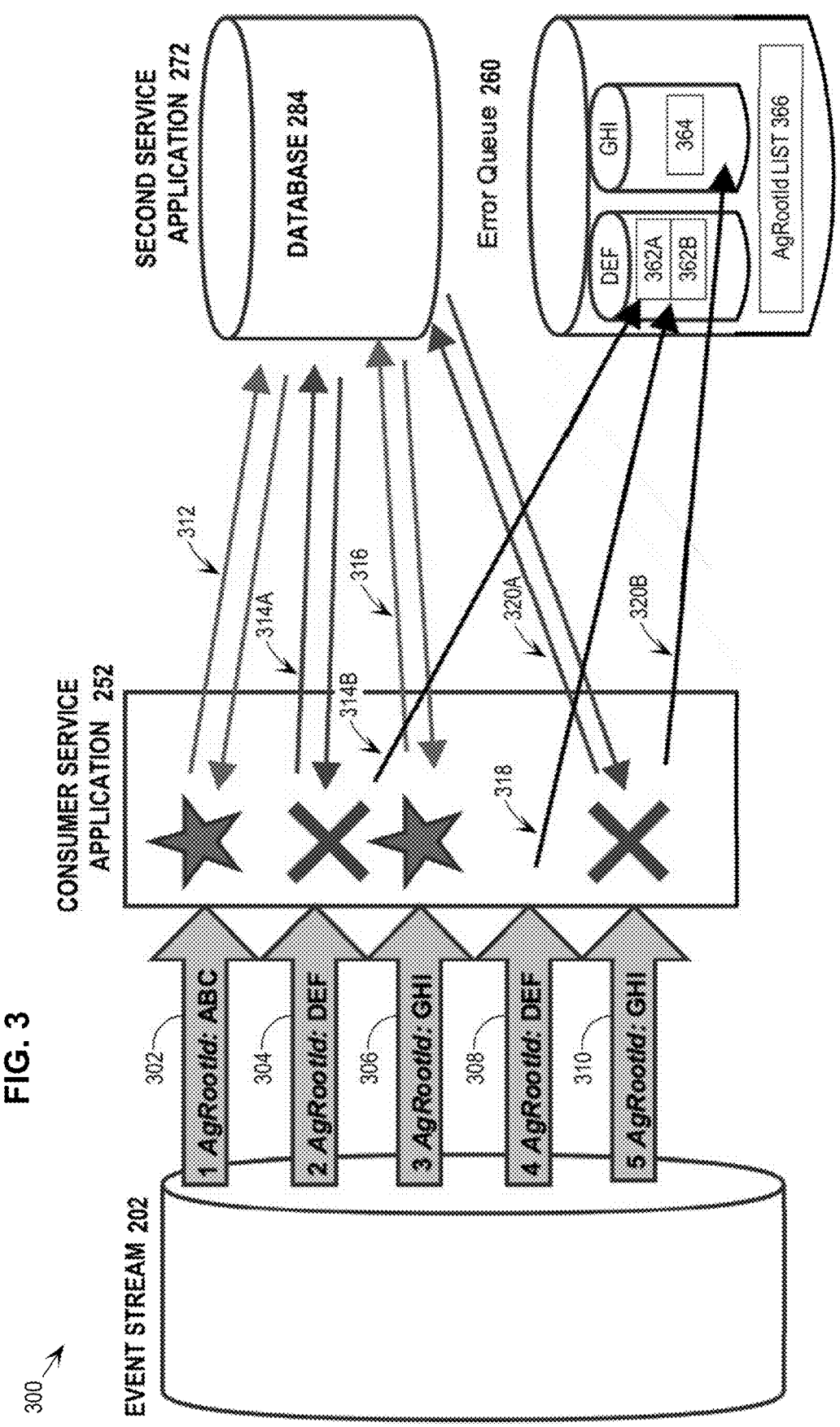
FIG. 3 depicts a series of events, from an event stream, that an event listener determines to require a second service and, consequently, initiates a second application based on the information for the detected events.

To illustrate, FIG. 3 depicts a series of events, from event stream 202, that event listener 252 identifies as requiring the second service. As such, event listener 252 initiates second application 272 based on the information for the identified events. For example, event listener 252 identifies, from event stream 202, an event record 302 that includes a multi-system operation identifier that identifies the multi-system operation of booking an airline flight. Event record 302 further includes an aggregate root identifier "ABC" that identifies a particular flight that was processed by the first application 212. According to one or more embodiments, event records include any metadata, derived from the commit records in commit log 228 of the first database system 220, needed for the multi-system operation identified therein.

After determining that aggregate root identifier "ABC" is not present within error queue 260 based on a list of aggregate identifiers 366 (as described in further detail below), event listener 252 sends information from event record 302 to second application 272 for processing. In response to receiving the information from event record 302, the second application 272 sends commands to the second database system 280 to perform a second transaction TX2 that makes the second changes to perform the multi-system operation identified in event record 302. The specific commands sent by the second application 272 are based on the metadata obtained from event record 302. For the purpose of illustration, it shall be assumed that those changes include adjusting an account balance, which is stored in a row of table 286, to indicate that funds were used to buy airfare.

In the example of FIG. 3, second application 272 successfully performs the second service based on event record 302. According to one or more embodiments, second application 272 returns a success message to event listener 252 as indicated by result 312 of FIG. 3. In connection with this successful processing, the second transaction TX2 commits, and commit records for the second transaction are stored in a commit log 288 of the second database system 280. Consequently, upon commit of the second transaction TX2, all changes made by the second transaction will be reflected in commit records that are all assigned the same transaction identifier TX2-id. Specifically, the commit records for the second transaction TX2 will contain the before and after values of all data items changed by the second transaction TX2.

Upon commit of the second transaction TX2, databases 224 and 284 involved in the multi-system operation are consistent with respect to event 302. For example, the committed changes of table 226 reflect the reservation that was made, and the committed changes of table 286 reflect the account balance reduction due to the airfare purchase.

In the present example, only two services were involved in the illustrated multi-system operation. Consequently, once TX1 has been committed in the first database system 220 and TX2 has been committed in the second database system 280, the multi-system operation has been completed. However, a multi-system operation may involve any number of systems. Multi-system operations are not complete until the necessary changes have been committed in each of the systems involved in the multi-system operations.

Failure of a Service in a Multi-System Operation

Unfortunately, it is possible that some of the systems are unable to complete their respective portion of the multi-system operation. For example, as depicted in FIG. 3, event listener 252 determines that event record 304 (which includes an aggregate root identifier "DEF") from event stream 202 also requires the second service. After determining that the aggregate root identifier "DEF" is not included in the list of aggregate identifiers 366 (as described in further detail below), event listener 252 sends information from event record 304 to second application 272 for processing.

As depicted in result 314A of FIG. 3, second application 272 fails to perform the second service as required for event record 304. A failure to perform the second service for event record 304 may be caused a variety of issues. For example, second application 272 fails to perform the second service as required for event record 304 because of an error in the payload of event record 304 as created by streaming application 232. As another example, second application 272 fails to perform the second service as required for event record 304 because second application 272 relies on another service or source of information that has failed with respect to the second service for event record 304. As a further example, second application 272 fails to perform the second service as required for event record 304 because second application 272 detects a constraint violation in performing the second service as required for event record 304 (e.g., a hold has been placed on an account that is required to pay for the flight recorded in event record 304).

In response to detecting the failure of the second service, second application 272 sends a failure notification to event listener 252. According to one or more embodiments, in response to receiving the failure notification, event listener 252 causes second application 272 to retry processing event record 304 one or more times to ensure that the problem is not of a transient technical nature. According to one or more embodiments, event listener 252 has knowledge of classes of errors that are of technical nature that may be transient (e.g. network error) and those that indicate a real problem with the event itself (e.g. database constraint violation, JSON unmarshalling error, etc) and causes re-processing of the event if the class of error detected by second application 272 may be transient.

Because the first service has already been performed for the aggregate root object identified in event record 304 by "DEF", and because of the effective decoupling of the first and second services (i.e., where the second task is performed asynchronously relative to performance of the first task) which prevents reporting an error to a requesting entity, failure of the second service with respect to event record 304 results in the perpetuation of the two database systems 220 and 280 being in an inconsistent state relative to the multi-system operation for event 304.

Populating an Error Queue Based on a Service Failure

When encountering an event-processing error, consumer service application 252 stores an error record for the event associated with the failure of second application 272 within error queue 260. Error queue 260 is a durable queue stored in non-transitory storage, portions of which are pulled into memory, as needed. Each error record within error queue 260 is associated with an event record whose processing failure caused creation of the error record, and includes at least: an aggregate identifier for an aggregate root object (either source or destination) for the associated event record; an enqueue timestamp; information from the associated event record; a status such as "failed" (indicating that the error record either records a failed attempt at processing an event record and is pending remediation) or "stalled" (indicating that the error record represents an event record that was not processed because the aggregate identifier of the record was already in the error queue 260); and information identifying a particular task represented by the error record. The enqueue timestamp is one of: a timestamp that records the time at which the error record was enqueued; a commit timestamp from the associated event record; a time at which event listener 252 receives the associated event record; or a time at which a failure was detected from second application 272, etc. The error records in error queue 260 are searchable by aggregate root identifier.

According to one or more embodiments, an error record also includes a fixed event record if applicable, where a fixed event record is a representation of a fixed version of the event record, once the event record has been remediated.

According to one or more embodiments, when event listener 252 adds an error record to error queue 260 based on a failure of second application 272 to perform the second service for a given event record, event listener 252 also generates a notification, such as a notification that alerts a remediation team (e.g., via an email message) as to the creation of the new error record. According to one or more other embodiments the notification causes a remediation application to automatically repair the event record that failed.

Thus, continuing with the previous example, in response to receiving the failure notification for event record 304, event listener 252 generates an error record 362A (as depicted in FIG. 3) for event record 304 that includes the enqueue timestamp for the error record 362A, the aggregate identifier "DEF" from event record 304, a status of "failed", an identifier of the multi-system operation being performed in connection with event record 304 (i.e., booking an airline flight), and information from event record 304 needed to perform the multi-system operation. Event listener 252 stores error record 362A in error queue 260 as indicated by result 314B.

According to one or more embodiments, event listener 252 previously determined that "DEF" was not in the list of aggregate identifiers 366, and as such, in connection with adding the new error record 362A to error queue 260, event listener 252 adds "DEF" to the list of aggregate identifiers 366. The list of aggregate identifiers 366 is an index, array, lookup table, or other structure held in memory that indicates what aggregate root identifiers are presently included in error queue 260. Since error record 362A was created based on a failure of second application 272, event listener 252 also alerts the remediation team regarding error record 362A.

According to embodiments, upon start-up, event listener 252 causes a query of aggregate identifiers in error queue 260 to be run and populates the list of aggregate identifiers 366 with any currently-queued aggregate root identifiers included in the query results.

Screening Event Records Based on an Error Queue

When multiple event records relating to a particular aggregate root object come through event stream 202, the events are processed in the order in which the events were received in order to avoid data corruption. For example, two event records that identify aggregate root identifier "DEF" (i.e., event records 304 and 308) come through event stream 202 as depicted in FIG. 3. The information for event record 304 would cause the second application 272 to deduct the price of a ticket from a particular bank account, and the information for event record 308 marks the particular bank account as "frozen". These two events reflect the desire of a user to buy a ticket using the automated system and then to freeze their account (with respect to the system) so that no additional purchases can be made through the system without explicit authorization from the client to "unfreeze" the account.

When processed in order, the processing of event record 304 causes second application 272 to deduct the price of the ticket from the correct bank account and then the processing of event record 308 causes second application 272 to properly freeze the account. However, when processed out of order, the processing of event record 308 first causes second application 272 to freeze the account, and second application 272 is then blocked from deducting the price of the ticket from the bank account as required for event record 304.

Thus, event stream 202 delivers events to event listener 252 in order of commit within commit log 228, which allows event listener 252 to cause second application 272 to process the event records in order of commit time. Furthermore, according to one or more embodiments, ordering of events from event stream 202 is preserved by processing all events for a given aggregate root identifier using the same processing thread, e.g., running on server device 250.

Stalling an Event Record

Returning to the discussion of flowchart 100, at step 106, in response to receiving the first event record, it is determined whether the first aggregate identifier is associated with any error queue record in an error queue. For example, event listener 252 receives, from event stream 202, two additional event records 306 and 308. Processing of event record 306 is discussed in connection with step 112 of flowchart 100 below. According to one or more embodiments, event listener 252 may submit event record 306 and event record 308 to the second application 272 for processing in any order because the events are for different aggregate identifiers.

In response to receiving event record 308, event listener 252 determines whether the aggregate identifier "DEF" included in event record 308 is associated with any error queue record in error queue 260, e.g., by checking the list of aggregate identifiers 366. In this example, error record 362A has already been added to error queue 260 and, as such, event listener 252 finds that "DEF" is included in the list of aggregate identifiers 366.

According to one or more embodiments, event listener 252 performs a further check (after finding a particular aggregate identifier in the list of aggregate identifiers 366) by performing a query over error queue 260 to determine whether there exists an error record within error queue 260 that lists the particular aggregate identifier. This further check helps to prevent race conditions, based on lag time in updating the list of aggregate identifiers 366, from creating a false positive hit for error queue 260. According to the previous example, an error record 362A for event record 304 is stored in error queue 260 and, as such, event listener 252 determines that the aggregate root identifier "DEF" is associated with at least one error record in error queue 260.

At step 108 of flowchart 100, responsive to determining that the first aggregate identifier is associated with a first error queue record in the error queue, a second error queue record for the first event record is added to the error queue without causing the second service to perform the second task. For example, in response to determining that the aggregate root identifier "DEF" is associated with at least one error record (i.e., error record 362A) in error queue 260, event listener 252 creates a new error record 362B. Error record 362B includes the enqueue timestamp for the error record 362B, the aggregate identifier "DEF" from the associated event record 308, a status of "stalled", an identifier of the multi-system operation being performed in connection with event record 308 (e.g., freezing an account for flight booking purposes), and information from event record 308 required for the multi-system operation. As indicated in result 318 of FIG. 3, event listener 252 stores error record 362B in error queue 260 without sending information for event record 308 to second application 272 for processing. This ensures that the events having to do with aggregate root identifier "DEF" are stalled when there is a problem with a previously-processed event with the aggregate root identifier "DEF".

Processing Subsequent Event Records

According to one or more embodiments, since each event record is associated with a given aggregate root identifier, second application 272 need only process events pertaining to a given aggregate root identifier in order. This is because processing event records that pertain to other aggregate root identifiers (other than a given root identifier) would not affect the information in the object identified by the given root identifier. Thus, events not relating to the same aggregate roots as error records in error queue 260 may be processed without regard for the status of remediation of error records in error queue 260.

To illustrate, and continuing with the discussion of flowchart 100 at step 110, a second request is received where the second request requests performance of a second multi-system operation that involves: a third task to be performed by the first service, and a fourth task to be performed by the second service asynchronously relative to performance of the third task; wherein the third task involves a second item identified by a second aggregate identifier. For example, client device 200 submits, to first application 212, a second request to book a flight. As discussed in further detail above, the first application 212 stores information in database 224 in connection with this second request, which is committed and a record of which is stored in commit log 228.

At step 112, after the first service has completed performance of the third task, a second event record associated with the second multi-system operation is received, wherein the second event record includes the second aggregate identifier. For example, streaming application 232 creates an event record 306 with aggregate root identifier "GHI" based on commit log 228, and inserts event record 306 into event stream 202. Event listener 252 receives event record 306 that includes aggregate root identifier "GHI".

At step 114, after the second error queue record has been added to the error queue, and in response to receiving the second event record, it is determined whether the second aggregate identifier is associated with any error queue record in the error queue. For example, after event listener 252 added event record 362A to error queue 260, aggregate identifier "DEF" is the only aggregate identifier present in error queue 260. Thus, in response to receiving event record 306, event listener 252 determines that aggregate root identifier "GHI" is not currently present in error queue 260 based on the list of aggregate identifiers 366.

At step 116, responsive to determining that the second aggregate identifier is not associated with any error queue record in the error queue, the second service is caused to perform the fourth task. For example, in response to determining that aggregate root identifier "GHI" is not currently present in error queue 260, event listener 252 sends information from event record 306 to second application 272 for processing. In response to receiving the information from event record 306, the second application 272 sends commands to the second database system 280 to perform a transaction that makes the changes required to perform the multi-system operation identified in event record 306 (referred to in flowchart 100 as the fourth task). Second application 272 successfully performs the second service based on event record 306. According to one or more embodiments, second application 272 returns a success message to event listener 252 as indicated by result 316 of FIG. 3.

After successfully processing event record 306, event listener 252 receives event record 310 from event stream 202. Event listener 252 determines that event record 310 (which includes the aggregate root identifier "GHI") from event stream 202 requires the second service. Thus, after determining that the aggregate root identifier "GHI" is not included in a list of aggregate identifiers 366, event listener 252 sends information from event record 310 to second application 272 for processing.

As depicted in result 320A of FIG. 3, second application 272 fails to perform the second service as required for event record 310. In response to detecting the failure of the second service, second application 272 sends a failure notification to event listener 252. In response to receiving the failure notification for event record 310, event listener 252 generates an error record 364 for event record 310 that includes the enqueue timestamp for the error record 364, the aggregate identifier "GHI" from event record 310, a status of "failed", an identifier of the multi-system operation being performed in connection with event record 310, and information from event record 310 required to perform the multi-system operation. Event listener 252 stores error record 364 in error queue 260 as indicated by result 320B.

According to one or more embodiments, event listener 252 previously determined that "GHI" was not in error queue 260, and as such, in connection with adding the new error record 364 to error queue 260, event listener 252 adds "GHI" to the list of aggregate identifiers 366. Event listener 252 also alerts the remediation team regarding error record 364.

Thus, utilizing the aggregate identifiers present in the error queue as a guide for which event records to process allows the system to selectively block events pertaining to aggregate identifiers present in the error queue from being processed in order to maintain the integrity of the data for the system without causing the system to halt all event processing at the second service.

Re-Processing an Event from the Error Queue

Once alerted to a failed event, the remediation team attempts to resolve the issue that caused the event processing to fail. Specifically, the remediation team generates a revised version of the failed event record, referred to herein as a "fixed" event record. The remediation team further edits the error record that is being addressed to include the fixed event record, and to change the status of the error record to "ready".

An error queue listener 292, running on a server device 290, listens to changes made to error queue 260. According to one or more embodiments, the error queue listener 292 may be distinct from event listener 252 or may be part of the same application as event listener 252.

Error queue listener 292 detects the change of status of a given error record in error queue 260 to "ready" and automatically generates a retry event record based on the error record with the "ready" status. The retry event record includes the fixed event record from the error record, and also includes information identifying the associated error record. Error queue listener 292 inserts the retry event record into a retry event stream 204. As described herein, event listener 252 processes retry event stream 204. However, a separate event listener may be used to process event records from retry event stream 204.

Event listener 252 detects the retry event record in retry event stream 204 and processes the retry event record in a manner similar to event records from event stream 202 described above. According to one or more embodiments, if the second service is performed successfully for the retry event record, then (because it is a retry event from retry event stream 204) event listener 252 sets the status of the associated error record in error queue 260 to "completed".

However, if the second application 272 returns a failure notification when processing the retry event record, event listener 252 sets the status of the corresponding error record back to "failed" and event listener 252 again alerts the remediation team regarding the error record.

Processing Stalled Events

Once event listener 252 sets the status of an error record in error queue 260 to "completed", any other events queued behind the completed error record in error queue 260 need to be routed through event listener 252 to be handled in order of enqueue timestamp. For example, the remediation team fixes event record 304 and sets the status of error record 362A (corresponding to event record 304) to "ready". Error queue listener 292 detects the change in status to "ready" and generates a retry event record based on error record 362A. Error queue listener 292 inserts the retry event record into retry event stream 204.

Event listener 252 detects the retry event record in event stream 204 and causes second application 272 to process the retry event record. Second application 272 successfully processes the retry event record and, as a result, event listener 252 sets the status of error record 362A to "completed". However, in the case that second application 272 cannot process the retry event record, event listener 252 sets the status of error record 362A back to "failed" and sends another message to the remediation team.

Once event listener 252 sets the status of error record 362A to "completed", event listener 252 searches error queue 260 for any other error records with the same aggregate identifier (i.e., "DEF") of error record 362A that do not have the status of "completed". If any are found, then event listener 252 changes the status of the error record associated with "DEF" having the earliest enqueue time (e.g., error record 362B) to "ready". As a result, error queue listener 292 detects the change in status to "ready" and generates a retry event record from error record 362B. Since error record 362B does not include a fixed version of the event record, then error queue listener 292 includes the original event record 308, associated with error record 362B, into the retry event record. Error queue listener 292 inserts the retry event record into retry event stream 204, and the retry event record is automatically processed as described above. In this way, all error records associated with a given aggregate identifier will be retried in order of enqueue timestamp until all of the error records associated with the aggregate identifier are completed (assuming that the remediation team is able to fix all issues with the event records).

Once all error records for a given aggregate identifier have "completed" statuses, then event listener 252 removes the given aggregate identifier from the list of aggregate identifiers 366. Embodiments have an advantage over the previous solution in that nearly all subsequent events are likely to still be processed.

Operating Threshold

According to one or more embodiments, event listener 252 halts the second application 272 based on determining that the number of aggregate identifiers in error queue 260 has reached a predetermined threshold number of aggregate identifiers or that the total number of error records in error queue 260 has reached a predetermined threshold number of error records. According to one or more embodiments, event listener 252 halts the second application 272 based on determining that size of error queue 260 has reached a predetermined threshold size. According to one or more embodiments, event listener 252 halts the second application 272 based on determining that over a certain predefined percentage of event records, per unit of time, are failing to be processed. For example, event listener 252 determines that second application 272 has failed to process at least a predetermined threshold percentage (e.g., 35%) of event records being processed over a set amount of time (e.g., the last minute) and halts processing by second application 272.

Such a check on the functioning of second application 272 effectively halts the service when there is a pervasive problem that likely does not need to be fixed on an individual event record basis. For example, second application 272 fails to perform the second service as required for an event record because second application 272 relies on another service or source of information that has failed with respect to the second service for the event record. In this case, if the other service or source of information is down or there is a pervasive networking error, then second application 272 will fail to process a large number of event records (perhaps every event record that second application 272 attempts to process while the problem persists). In case of a halt of an entire service, event listener 252 sends information to the remediation team indicating the service halt.

Populating the Commit Logs

As explained above, the commit logs of a transaction involved in a multi-system operation are populated ("injected") with information required for other systems to determine what they must do as part of that multi-system operation. During the processing of the commit logs, an event stream is generated. For example, streaming application 232 generates an event stream 202 based on information from the commit log 228 associated with the first application 212. Each system involved in a multi-system operation may have such a streaming application. The streaming applications produce "event records".

For each event represented in the event stream, there is information about the event that may be referred to as the "event payload". The event payload is controlled by the application itself, because the application of each service determines what information should be stored and committed as part of the same database transaction that is making changes to the other tables used by the service. For example, the event payload for an event created by an update to table 226 (by first application 212) should have enough information for second application 272 to extract the data for a corresponding update that second application 272 needs to make to table 286.

Architecture for Implementing Multi-System Operations

FIG. 2 is a block diagram that depicts an example arrangement of a system to implement multi-system operations. According to one or more embodiments, first database system 220 and second database system 280 are database systems managed by one or more database management systems.

Database systems 220 and 280 include a database server 222 and a database server 282, respectively. A database server instance (or "instance") is a server that comprises a combination of the software and allocation of resources from a computing device that is part of the database system in which the database server belongs. Specifically, a server, such as a database server, is a combination of integrated software components and an allocation of computational resources, such as memory, a node (i.e., a computing device and/or memory accessible to the computing device), and/or processes on the node for executing the integrated software components on a processor, the combination of the software and computational resources being dedicated to performing a particular function on behalf of one or more clients such as first application 212 or second application 272 described herein.

Database server 222 and database server 282 each maintains access to and manages databases 224 and 284, respectively, where databases 224 and 284 are stored on one or more sets of disk drives. According to one or more embodiments, access to a given database comprises access to (a) a set of disk drives storing data for the database, and (b) data blocks stored thereon. The databases store database objects, including tables 226, and 286, and commit logs 228 and 288, respectively. Furthermore, event log 240 and error queue 260 are databases that may be managed by one of the database systems depicted in FIG. 2 or by one or more database systems not depicted in FIG. 2. According to one or more embodiments, event log 240 and/or error queue 260 may be stored as one or more database objects within one of databases 224 and 284.

Server devices 210, 230, 250, 270, and 290 are implemented by any type of computing device that is capable of running an application, as depicted in FIG. 2. Specifically, in FIG. 2, server device 210 is configured with a first application 212, server device 230 is configured with a streaming application 232, server device 250 is configured with an event listener 252, server device 270 is configured with a second application 272, and server device 290 is configured with an error queue listener 292 (which is also an application). While these server devices and applications are depicted as distinct, any of the depicted applications may run on any server device.

An application is a combination of integrated software components and an allocation of computational resources, such as memory, a computing device and/or memory accessible to the computing device, and/or processes on the node for executing the integrated software components on a processor, the combination of the software and computational resources being dedicated to performing a particular function described for the application.

One or more of the functions attributed to applications 212, 232, 252, 272, and error queue listener 292, as described herein, may be performed any other logical entity that is part of the system, according to one or more embodiments. Server devices 210, 230, 250, 270, and 290 may be configured with other mechanisms, processes and functionalities, depending upon a particular implementation. Also, the system depicted in FIG. 2 may comprise other devices, including client devices, server devices, storage devices, networks, and display devices, according to one or more embodiments.

In an embodiment, each of the processes and/or functionality described in connection with each of applications 212, 232, 252, 272, and error queue listener 292 is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
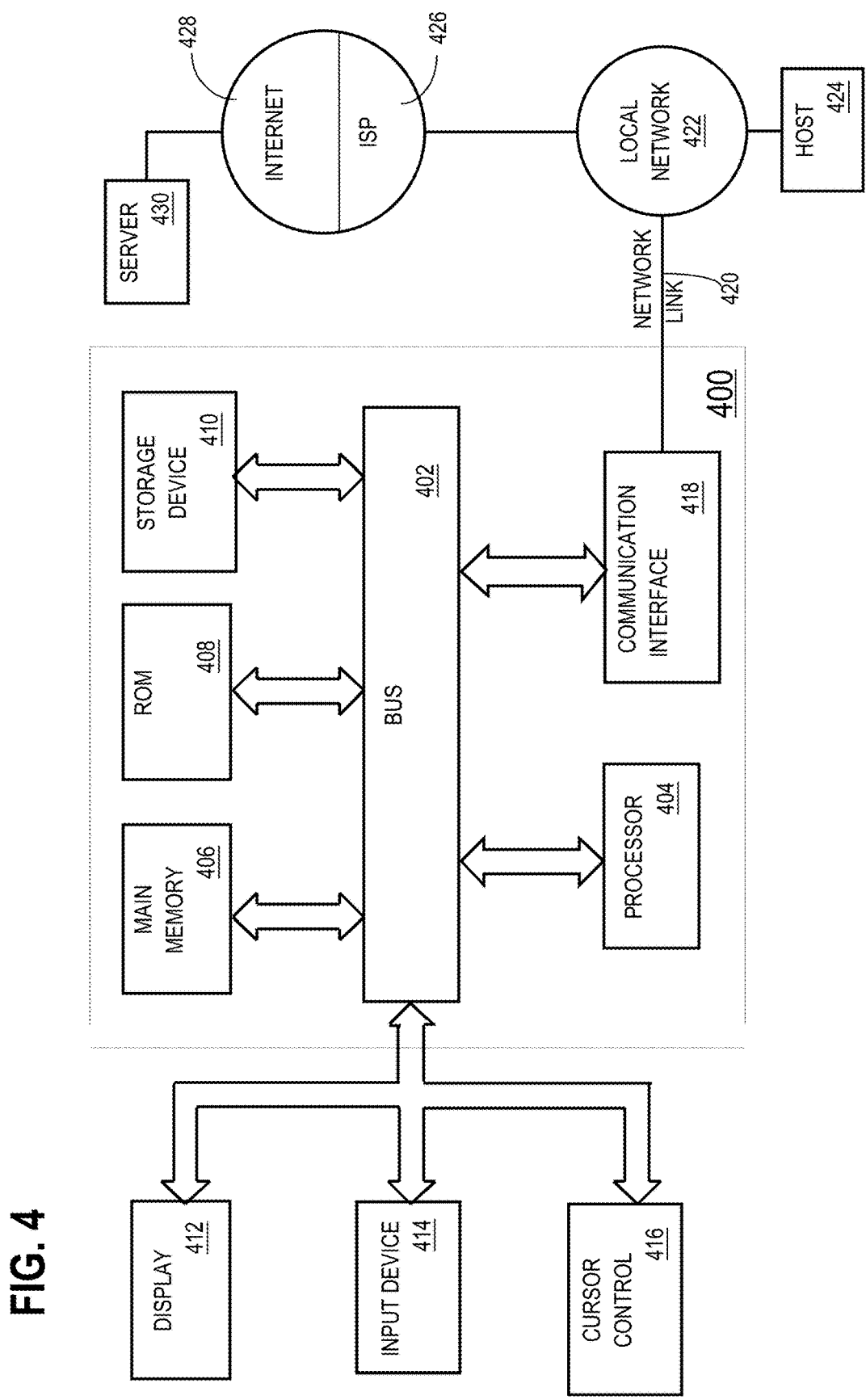
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first request to perform a first multi-system operation that involves:
   a first task to be performed by a first service, and
   a second task to be performed by a second service asynchronously relative to performance of the first task;
   wherein the first task involves an item identified by a first aggregate identifier;
   after the first service has completed performance of the first task, receiving a first event record associated with the first multi-system operation, wherein the first event record includes the first aggregate identifier;
   in response to receiving the first event record, determining whether the first aggregate identifier is associated with any error queue record in an error queue;
   responsive to determining that the first aggregate identifier is associated with a first error queue record in the error queue, adding a second error queue record for the first event record to the error queue without causing the second service to perform the second task;
   receiving a second request to perform a second multi-system operation that involves:
   a third task to be performed by the first service, and
   a fourth task to be performed by the second service asynchronously relative to performance of the third task;
   wherein the third task involves a second item identified by a second aggregate identifier;
   after the first service has completed performance of the third task, receiving a second event record associated with the second multi-system operation, wherein the second event record includes the second aggregate identifier;
   after the second error queue record has been added to the error queue, and in response to receiving the second event record, determining whether the second aggregate identifier is associated with any error queue record in the error queue;
   responsive to determining that the second aggregate identifier is not associated with any error queue record in the error queue, causing the second service to perform the fourth task;
   wherein the method is performed by one or more computing devices.

2. The method of claim 1, further comprising, prior to receiving the first request to perform the first multi-system operation:
   receiving a third request to perform a third multi-system operation that involves:
   a fifth task to be performed by the first service, and
   a sixth task to be performed by the second service asynchronously relative to performance of the fifth task;
   wherein the fifth task involves the item identified by the first aggregate identifier;
   after the first service has completed performance of the fifth task, receiving a third event record associated with the third multi-system operation, wherein the third event record includes the first aggregate identifier;
   in response to receiving the third event record, determining whether the first aggregate identifier is associated with any error queue record in the error queue;
   responsive to determining that the first aggregate identifier is not associated with any error queue record in the error queue, causing the second service to initiate the sixth task;
   receiving a failure notification from the second service indicating a failure to complete the sixth task; and
   responsive to receiving the failure notification from the second service indicating the failure to complete the sixth task, adding the first error queue record to the error queue;
   wherein the first error queue record is associated with the first aggregate identifier based on the third event record including the first aggregate identifier.

3. The method of claim 2, further comprising, after adding the second error queue record for the first event record to the error queue:
   receiving a request to re-initiate the sixth task;
   responsive to receiving the request to re-initiate the sixth task, causing the second service to perform the sixth task.

4. The method of claim 3, further comprising, after causing the second service to perform the sixth task:
   detecting that the sixth task was completed successfully;
   responsive to detecting that the sixth task was completed successfully:
   determining which error queue record, of a set of one or more records in the error queue having the first aggregate identifier, is associated with an earliest enqueue timestamp;
   wherein each error queue record includes at least: an enqueue timestamp, an aggregate identifier, and information identifying a particular task represented by the respective error queue record;
   responsive to determining that the second error queue record is associated with the earliest enqueue timestamp among the set of one or more records, causing the second service to perform the second task based on the second error queue record including information identifying the second task.

5. The method of claim 2, wherein the failure to complete the sixth task was caused, at least in part, by at least one of the first service or the second service.

6. The method of claim 2, wherein the failure to complete the sixth task was caused, at least in part, by a service other than the first service or the second service.

7. The method of claim 1, wherein receiving the first event record is performed by the second service.

8. The method of claim 1, wherein receiving the first event record is performed by a service other than the second service.

9. The method of claim 1, wherein the second service for all event records associated with a particular aggregate identifier are performed by a particular processing thread.

10. One or more non-transitory computer-readable media storing instructions which, when executed by one or more processors, cause:
- receiving a first request to perform a first multi-system operation that involves:
  - a first task to be performed by a first service, and
  - a second task to be performed by a second service asynchronously relative to performance of the first task;
- wherein the first task involves an item identified by a first aggregate identifier;
- after the first service has completed performance of the first task, receiving a first event record associated with the first multi-system operation, wherein the first event record includes the first aggregate identifier;
- in response to receiving the first event record, determining whether the first aggregate identifier is associated with any error queue record in an error queue;
- responsive to determining that the first aggregate identifier is associated with a first error queue record in the error queue, adding a second error queue record for the first event record to the error queue without causing the second service to perform the second task;
- receiving a second request to perform a second multi-system operation that involves:
  - a third task to be performed by the first service, and
  - a fourth task to be performed by the second service asynchronously relative to performance of the third task;
- wherein the third task involves a second item identified by a second aggregate identifier;
- after the first service has completed performance of the third task, receiving a second event record associated with the second multi-system operation, wherein the second event record includes the second aggregate identifier;
- after the second error queue record has been added to the error queue, and in response to receiving the second event record, determining whether the second aggregate identifier is associated with any error queue record in the error queue;
- responsive to determining that the second aggregate identifier is not associated with any error queue record in the error queue, causing the second service to perform the fourth task.

11. The one or more non-transitory computer-readable media of claim 10, wherein the instructions further comprise instructions which, when executed by one or more processors, cause, prior to receiving the first request to perform the first multi-system operation:
- receiving a third request to perform a third multi-system operation that involves:
  - a fifth task to be performed by the first service, and
  - a sixth task to be performed by the second service asynchronously relative to performance of the fifth task;
- wherein the fifth task involves the item identified by the first aggregate identifier;
- after the first service has completed performance of the fifth task, receiving a third event record associated with the third multi-system operation, wherein the third event record includes the first aggregate identifier;
- in response to receiving the third event record, determining whether the first aggregate identifier is associated with any error queue record in the error queue;
- responsive to determining that the first aggregate identifier is not associated with any error queue record in the error queue, causing the second service to initiate the sixth task;
- receiving a failure notification from the second service indicating a failure to complete the sixth task; and
- responsive to receiving the failure notification from the second service indicating the failure to complete the sixth task, adding the first error queue record to the error queue;
- wherein the first error queue record is associated with the first aggregate identifier based on the third event record including the first aggregate identifier.

12. The one or more non-transitory computer-readable media of claim 11, wherein the instructions further comprise instructions which, when executed by one or more processors, cause, after adding the second error queue record for the first event record to the error queue:
- receiving a request to re-initiate the sixth task;
- responsive to receiving the request to re-initiate the sixth task, causing the second service to perform the sixth task.

13. The one or more non-transitory computer-readable media of claim 12, wherein the instructions further comprise instructions which, when executed by one or more processors, cause, after causing the second service to perform the sixth task:
- detecting that the sixth task was completed successfully;
- responsive to detecting that the sixth task was completed successfully:
  - determining which error queue record, of a set of one or more records in the error queue having the first aggregate identifier, is associated with an earliest enqueue timestamp;
  - wherein each error queue record includes at least: an enqueue timestamp, an aggregate identifier, and information identifying a particular task represented by the respective error queue record;
  - responsive to determining that the second error queue record is associated with the earliest enqueue timestamp among the set of one or more records, causing the second service to perform the second task based on the second error queue record including information identifying the second task.

14. The one or more non-transitory computer-readable media of claim 11, wherein the failure to complete the sixth task was caused, at least in part, by at least one of the first service or the second service.

15. The one or more non-transitory computer-readable media of claim 11, wherein the failure to complete the sixth task was caused, at least in part, by a service other than the first service or the second service.

16. The one or more non-transitory computer-readable media of claim 10, wherein receiving the first event record is performed by the second service.

17. The one or more non-transitory computer-readable media of claim 10, wherein receiving the first event record is performed by a service other than the second service.

18. The one or more non-transitory computer-readable media of claim 10, wherein the second service for all event records associated with a particular aggregate identifier are performed by a particular processing thread.

\* \* \* \* \*